United States Patent [19]

Dvorak

[11] 4,054,075
[45] Oct. 18, 1977

[54] SHEAR MECHANISM

[76] Inventor: Jim Dvorak, Cosmos, Minn. 56228

[21] Appl. No.: 742,418

[22] Filed: Nov. 17, 1976

[51] Int. Cl.² .............................................. B26D 5/12
[52] U.S. Cl. ...................................... 83/633; 83/639
[58] Field of Search ................. 83/625, 633, 634, 639,
83/644, 646, 196, 198; 72/453; 100/271

[56] References Cited

U.S. PATENT DOCUMENTS 3,255,655  6/1966  Stockard, Jr. ...................... 83/639 X

*Primary Examiner*—J. M. Meister
*Attorney, Agent, or Firm*—Stuart R. Peterson

[57] ABSTRACT

The shear mechanism includes two fixed plates and a plate movable therebetween. The movable plate has a notch in one side edge which is moved out of registry with notches in the fixed plate to effect a shearing operation, the movable plate having a blade associated with its notch and one of the fixed plates having a cooperable blade associated with its notch. The fixed plates each have two appropriately located circular holes in which are received a first pair of pins, the pins extending through slots in the movable plate so that the blade on the movable plate can move sufficiently relative to the blade on the fixed plate to perform its shearing operation. Offset from the slots in the movable plate are two appropriately located circular holes in which are received a second pair of pins, the second pair of pins extending through slots in the fixed plate of sufficient size so that the shearing action can take place. A first pair of actuating arms (one at each side of the mechanism) is pivotally mounted on one of the first pair of pins and a second pair of actuating arms (one at each side of the mechanism) is pivotally mounted on the other of said first pair of pins. The first pair of actuating arms is pivotally connected to one of the second pair of pins, and the second pair of actuating arms is pivotally connected to the other of said second pair of pins with the consequence that the movable plate is supported on and actuated by said arms so that when the ends of the arms remote from said first and second pair of pins are forcibly spread apart, the notch in the movable plate is moved out of registry with the notches in the fixed plates to enable the blades to perform the shearing operation.

10 Claims, 8 Drawing Figures

SHEAR MECHANISM

BACKGROUND OF THE INVENTION

1. Field of the Invention

This invention relates generally to shearing apparatus, and pertains more particularly to a shear mechanism for cutting metal bars and strips.

2. Description of the Prior Art

Shear mechanisms, of course, are not new, as various types of shear mechanisms have been devised in the past. A number of such mechanisms have involved heavy and cumbersome cast iron frames having massive jaw members on which are mounted the shear blades. It will be appreciated that substantial reactive forces can be involved when shearing various types of metal bars and strips, thereby necessitating relatively bulky equipment. The size of such shear mechanisms has contributed greatly to their cost. Cost reduction efforts have resulted in somewhat inferior shear mechanisms, particularly when attempts are made to produce a relatively lightweight and portable shear mechanism. Inasmuch as small job shops cannot afford the capital investment required for the purchase of massive equipment, such shops have been compelled to either send out the work to be cut to a larger plant or resort to time-consuming sawing operations. Therefore, a real need has existed for lightweight and portable shearing apparatus.

My U.S. Pat. No. 3,899,950, issued on Aug. 19, 1975, for "BAR SHEAR" has proved to be highly successful. Even though my patented shear has performed admirably, it still requires a number of moving parts and its cost, while less than most comparable prior art devices, has presented a challenge to provide a shear mechanism that will be even less expensive. Cost reduction and simplicity go virtually hand in hand, and while my patented mechanism has been less costly to produce, owing to its comparative simplicity, it still has left something to be desired as far as the ultimate in simplicity and low cost.

SUMMARY OF THE INVENTION

Accordingly, one object of the present invention is to provide an exceedingly inexpensive shear mechanism which is simple and lightweight.

Another object of the invention is to provide a shear mechanism lending itself readily to be constructed in a manner such that it is portable and can be readily moved from place to place with a given shop or easily transported to job sites away from the shop.

Another object is to provide a shear mechanism that will shoulder relatively large shearing forces and at the same time be compact and lightweight.

A further object of the invention is to provide an exceptionally rugged shear mechanism that is virtually maintenance-free.

Briefly, my invention comprises two upstanding fixed plates having a movable plate sandwiched therebetween. The several plates each have a notch extending inwardly from one edge, one fixed plate having a detachable shear blade associated with its notch and the movable plate having a cooperable shear blade associated with its notch. The two fixed plates each have two circular holes in which are received pins that pivotally mount two pairs of actuating arms. The movable plate also has formed therein two circular holes and additional pins are received in the two last-mentioned holes. An actuator, such as an air cylinder, forces the arms into different angular positions to cause the movable plate to be displaced with respect to the fixed plates in the performance of a shearing operation. Appropriately located slots in the fixed plates and appropriately located slots in the movable plate permit the movable plate to move sufficiently in effecting the shearing operation.

DESCRIPTION OF THE PREFERRED EMBODIMENT

Figure 1:
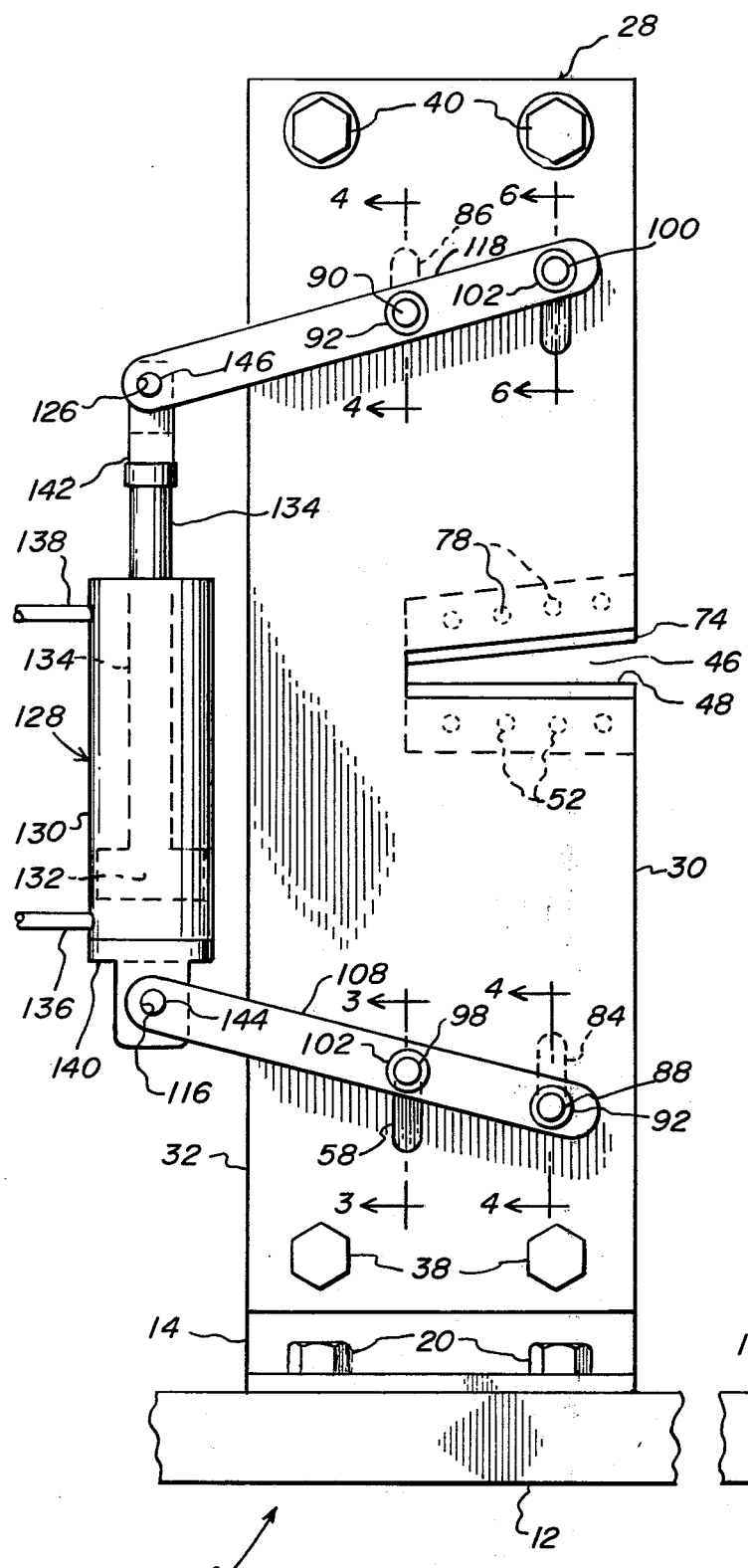
FIG. 1 is a side elevational view of a shear mechanism exemplifying my invention.
Figure 2:
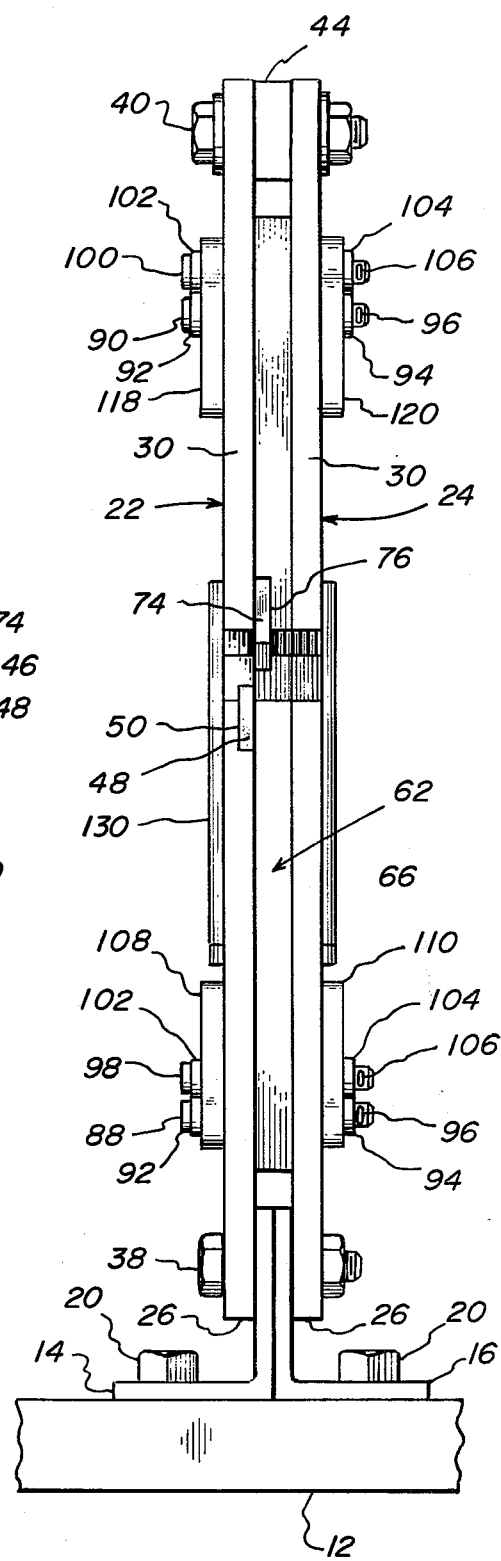
FIG. 2 is a front elevational view taken from the right in FIG. 1.

The shear mechanism selected for the purpose of illustrating my invention has been denoted generally by the reference numeral 10. It includes a base plate 12 having a pair of angle irons 14, 16 (best viewed in FIG. 8) provided with holes 18 in their horizontal flanges and holes 19 in their vertical flanges, the holes 18 accommodating bolts 20 that hold the angle irons 14, 16 in place on the base plate 12.

At this time attention is called to two side plates 22, 24 each having a bottom edge 26, a top edge 28, a forward edge 30 and a rear edge 32. Near the bottom edge 26 of each plate 22, 24 is a pair of holes 34, and near the top edge 28 of each plate 22, 24 is a pair of holes 36. Bolts 38 extend through the holes 34 and the holes 19 in the angle irons 14, 16 so as to fixedly support the side plates 22 and 24 in that the angle irons are held in place by the previously mentioned bolts 20. Additional bolts 40 extend through the top holes 36 in the plates 22, 24 and also through a pair of holes 42 in a spacer block 44. The spacer block 44 has a thickness corresponding to the combined thickness of the two vertical flanges belonging to the angle irons 14, 16, these vertical flanges having the holes 19 therein. Other spacing means, such as sleeves having the proper length can be substituted for the spacer block 44 that has been shown.

Notches 46 extend inwardly from the forward edge 30 of each fixed plate 22, 24. Attached to the fixed plate 22 is a shear blade 48, the plate 22 being recessed or under cut at 50 for the accumulation of the blade 48. The blade 48 is detachably fastened by a plurality of bolts 52 which extend into tapped holes provided in the plate 22 adjacent its notch 46.

Figure 8:
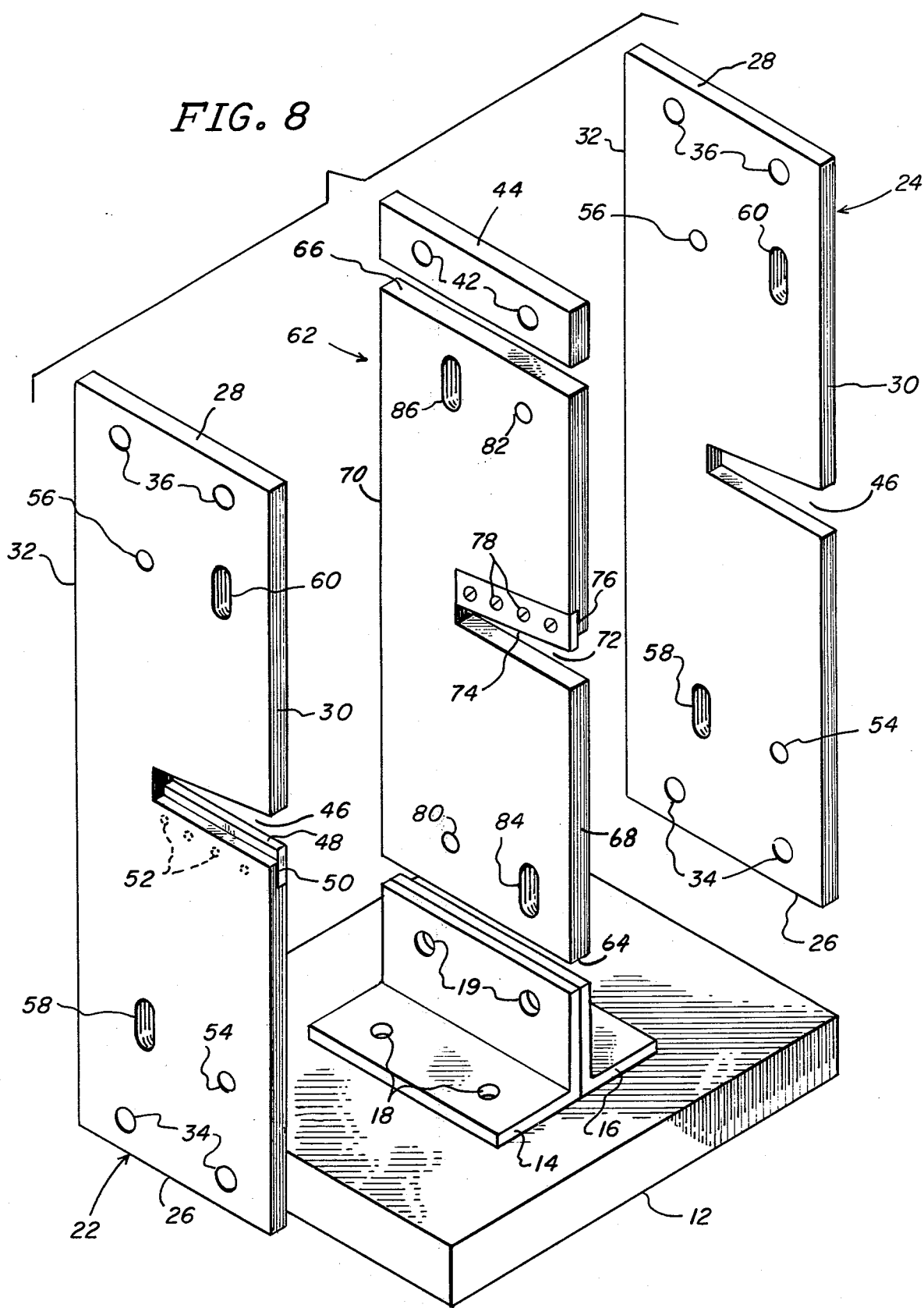
FIG. 8 is an exploded perspective view of the basic parts comprising my shear mechanism, the spaced relation further facilitating an understanding of the manner in which the illustrated mechanism is constructed.

A pair of circular holes 54, 56 is formed in each plate 22, 24. The hole 54 of each plate, as is evident from FIG. 8, is nearer the edges 26 and 30, and the hole 56 of each plate is nearer the edges 28 and 32. Also formed in the plates 22, 24 is a pair of elongated slots 58, 60. The slot 58 of each plate, as can also be seen in FIG. 8, is nearer the edges 26 and 32, whereas the slot 60 of each plate is nearer the edges 28 and 30. The purpose or role played by the apertures constituting the holes 54, 56 and the slots 58, 60 will be explained hereinafter.

Sandwiched between the two side or fixed plates 22, 24 is a movable plate 62 having a bottom edge 64, a top edge 66, a forward edge 68 and a rear edge 70. Inasmuch as the plate 62 is to be moved up and down with respect to the fixed plates 22, 24, it will be appreciated that the combined thickness of the vertical flanges of the angle irons 14, 16, these being the flanges containing the holes 19 therein, is sufficient to provide a slight amount of clearance between the two plates 22. 24. Whereas the vertical flanges on the angle iron 14, 16 provide the proper spacing for the movable plate 62 adjacent its bottom edge 64, the spacer blow 44 provides for proper clearance between the side plates 22, 24 adjacent the top edge 66 of the plate 62. In actual practice, vertical strips are used as spacers, there being one adjacent the rear edges 32 of the plates 22, 24 and two adjacent the forward edges 30 (one above and one below the notches 46). The movable plate 62 has a notch 72 extending inwardly from its forward edge 68. The notch 72 has a blade 74 associated therewith, the plate 62 being recessed or undercut at 76 so as to accommodate the blade 74. As with the blade 48, bolts 78 detachably fasten the blade 64 in place.

Figure 7:
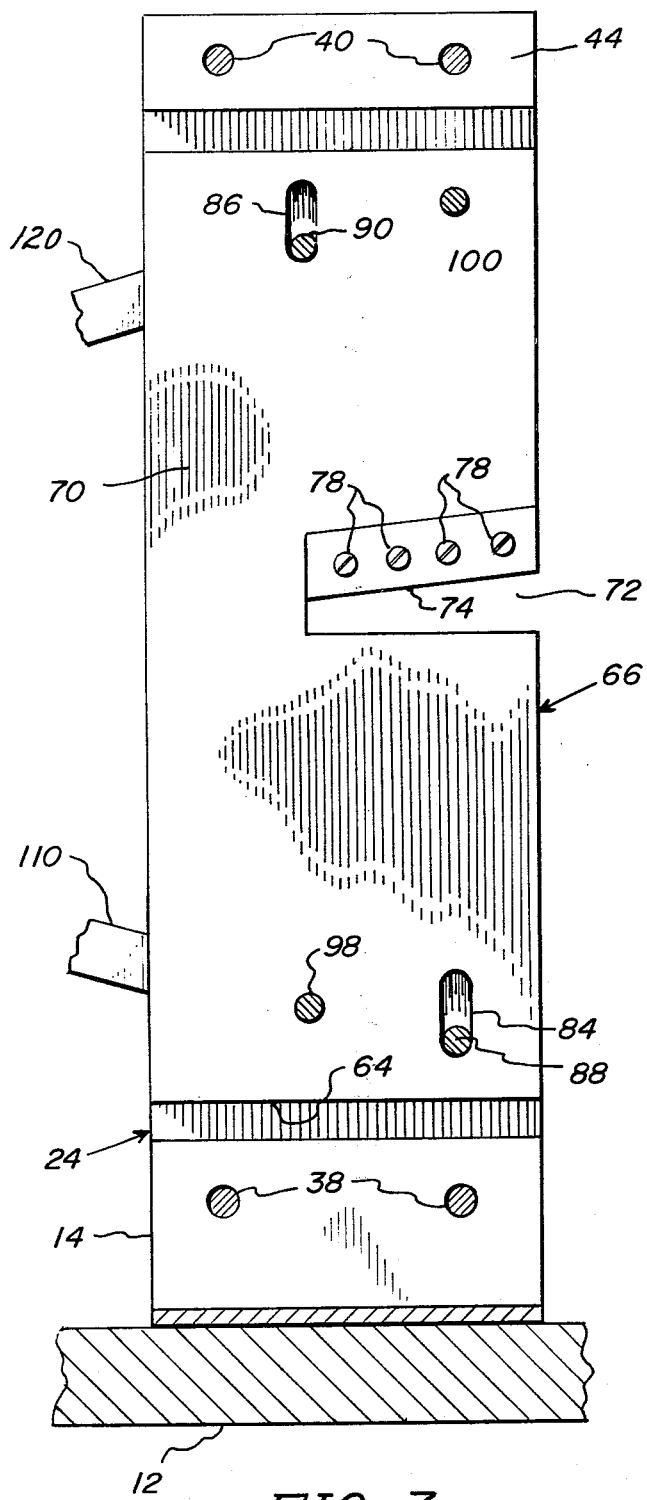
FIG. 7 is a view, partly in section, taken in the direction of line 7—7 of FIG. 2.

The movable plate 62 is formed with a pair of circular holes 80, 82 and a pair of elongated slots 84, 86. The hole 80, as can be appreciated from FIG. 7, is nearer the edges 64 and 70, and the hole 82 is nearer the edges 66 and 68. Although not completely understandable at this stage of the description, it can be pointed out in passing that the circular holes 80, 82 have the same general spacing as slots 58 and 60 in the fixed plates 22, 24, and the slots 84, 86 have the same general spacing as the holes 54, 56 in the plates 22, 24. As with the slots 58, 60 of the plates 22, 24 which extend parallel to the edges 30, the slots 84, 86 extend parallel to the edge 68 of the plate 62.

A headed pin 88 extends through the hole 54 in plate 22, through the slot 84 in the plate 62 and through the hole 54 in the plate 26. Similarly, a headed pin 90 extends through the circular hole 56 in the plate 22, the slot 86 in the plate 62 and the hole 56 in the plate 24. Washers 92 are located between the heads of the pins 88 and the plate 22, whereas additional washers 94 are disposed between cotter pins 96 and the plate 24. Still further, a headed pin 98 extends through the slot 58 in the plate 22, through the circular hole 80 in the plate 62 and, through the slot 58 in the plate 24. Another headed pin 100 extends through the slot 60 in the plate 22, through the circular hole 82 in the plate 62 and through the slot 60 in the plate 24. Washers 102 confront the plate 22 and washers 104 confront the plate 24 as far as the pins 98 and 100 are concerned, there being cotter pins 106 passing through the ends of the pins 98, 100 adjacent the washers 104.

Figure 3:
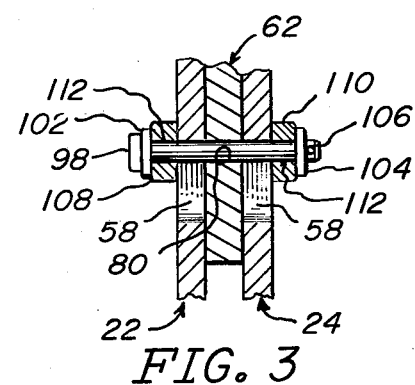
FIGS. 3, 4, 5 and 6 are sectional details taken in the direction of lines 3—3, 4—4, 5—5 and 6—6 of FIG. 1 for the purpose of clearly showing the various circular holes and elongated slots formed in the several plates.
Figure 4:
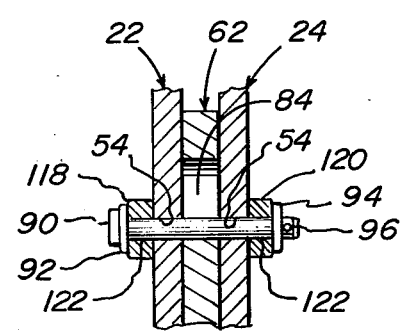
Figure 5:
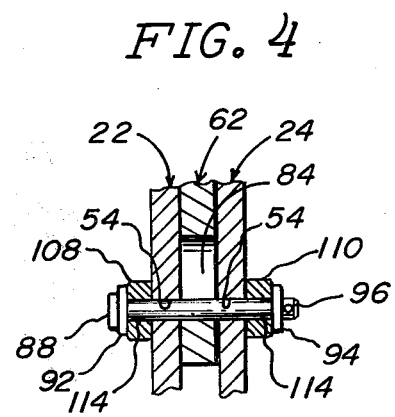
Figure 6:
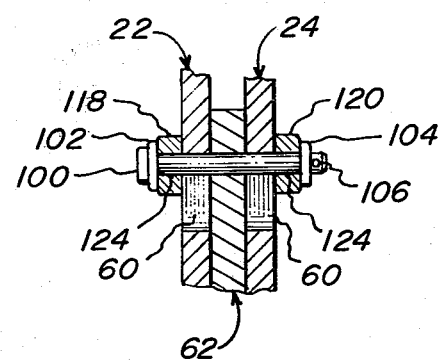

Two lower arms 108, 110 (one at one side of the shear mechanism 10 and one at the other side) have holes 112 and 114 (FIGS. 3 and 5, respectively) near one end thereof and a hole 116 at the other end. Two upper arms 118, 120 (hereagain one at one side of the mechanism 10 and one at the other side) have holes 122, 124 (FIGS. 4 and 6, respectively) corresponding to the holes 112 and 114 in the arms 108, 110 and a single hole 126 at the far end. As with the hole 116 in the arm 110, the hole 126 in the arm 120 cannot be seen.

As already mentioned, the pin 88 extends through the hole 54 in the fixed plate 22, through the slot 84 in the movable plate 62 and also through the circular hole 54 in the plate 24. Similarly, as also earlier stated, the pin 90 extends through the circular hole 56 in the fixed plate 22, through the slot 86 in the movable plate 62 and through the circular hole 56 in the other fixed plate 24. Since the side plates 22, 24 are fixed, it follows that the pin 88 provides a fixed pivot point or axis for the lower arms 108, 110, whereas the pin 90 provides a fixed pivot point or axis for the upper arms 118, 120.

The pins 98, 100, on the other hand, support the movable plate 62 since the pin 98 extends through the slot 58 in the plate 22, through the circular hole 80 in the movable plate 62 and through the slot 58 in the plate 22, the circular hole 80 providing only a slight clearance. By the same token, the pin 100 extends through the slot 60 in the plate 22 and through the slot 60 in the plate 24, being received in the circular hole 82 of the movable plate 62 which here again provides only a slight clearance with the pin. It is important to understand that the pins 98 and 100 provide the sole support for the movable plate 62.

A fluid actuator denoted generally by the reference numeral 128 is employed for urging or spreading apart the ends of the arms 108, 110 containing the holes 116 and the ends of the arms 118, 120 containing the holes therein. More specifically, the actuator 128 includes a cylinder 130 containing a reciprocal piston 132 having a piston rod 134. By means of tubes or conduits 136, 138 air or liquid can be forced into and withdrawn from the cylinder 130 in order to move the piston 132 vertically therein. The closed end of the cylinder 130, this being the lower end, has a U-shaped member 140 affixed thereto, whereas a U-shaped member 142 is mounted at the free end of the piston rod 134, the member 140 spanning or bridging the distance between the arms 108, 110 and the member 142 spanning the distance between the arms 118, 120. Thus, the U-shaped members 140, 142 provide laterally spaced legs for the accommodation of a pin 144 as far as the lower U-shaped member 140 is concerned and a pin 146 as far as the upper U-shaped member 142 is concerned.

Having presented the foregoing information, the manner in which my shear mechanism 10 operates should be easily understood. Nonetheless, a brief operational description, it is believed, will be of assistance in appreciating the full benefits to be derived from a practicing of my invention. With the piston rod 134 retracted as shown in FIG. 1, this results in the notch 72 of the movable plate 62 being in registry with the notches 46 of the fixed plates 22, 24. The shear mechanism 10 is thus in readiness for having the stock, such as a bar or strip (not shown), inserted into the aligned notches 46 and 72.

When the fluid under pressure is introduced into the lower end of the cylinder 130 via the tube 136, the piston 132 is forced upwardly with the consequence that its piston rod 134, through the U-shaped member 142 attached to its upper end, acts against the upper pair of actuating arms 118, 120. Concomitantly, the cylinder 130 is reactively urged downwardly so that the lower arms 108, 110 are forced downwardly through the U-shaped member 140.

In other words, the pins 144, 146 are urged farther apart with the consequence that the angulation of the arms 108, 110 with respect to the arms 118, 120 is changed. More specifically, the lower arms 108, 110 are rocked or rotated in a counterclockwise direction about the fixed axis provided by the pin 88, whereas the upper arms 118, 120 are rocked or rotated in a clockwise direction about the fixed axis provided by the pin 90.

Since the pin 98 passes through the lower arms 108, 112 and is thus carried thereby, it moves downwardly when the lower arms 108, 110 are rotated in a counterclockwise direction about the axis provided by the pin 88. Of course, the slots 58 in the fixed plates 22, 24 permit the pin 98 to move without interference. Also, inasmuch as the pin 98 passes through the circular hole 80 in the movable plate 62, the plate 62 is urged downwardly. By the same token, the upper arms 118, 120 are rotated in a clockwise direction about the axis provided by the pin 90 to cause the pin 100 to move downwardly. Because the pin 100 passes through the circular hole 76 in the movable plate 62, it, too, moves downwardly to lower the movable plate 62 just as the pin 98 is doing.

With the plate 62 moving downwardly, it follows that its notch 72 which is initially in registry with the notches 46 moves out of registry. Stated somewhat differently, the blade 74, being attached to the plate 62, is moved downwardly relative to the blade 48, which is attached to the plate 22, to effect the shearing of the stock, whether it be a rod, strip, or other work to be sheared, that was inserted in the notches, 46, 72 when they were in registry.

It should be recognized that the actuator 128 oes not exert a reactive force against any fixed member such as the base plate 12. In the prior art, the reactive force of the actuator had to be absorbed by a fixed member. This accounts for the massiveness of many of the prior art shear mechanisms.

It should also be recognized that the slots 58 and 60 in both of the plates 22, 24, as well as the slots 84, 86 in the plate 62, are of ample size so that the shearing operation is completed well before any of the pins 88, 90, 98 or 100 bear against the ends of these slots. During the actual shearing, there are reactive forces, but it should be appreciated that these forces are directed into the plates 22, 24 and 62 in such a way as to subject the plates 22, 24 to tension forces and the plate 62 to compressive forces. However, these forces are transmitted longitudinally within the plates and can readily be accommodated without having to make the plates unduly thick. As a matter of fact, the thickness of the plates 22 and 62 is influenced largely by the thickness of the blades 48 and 74. Since the plate 24 does not actively participate in the shearing function, it can be thinner than either of the other two plates 22 and 62. The sandwiching of the three plates 22, 24 and 62 together for all practical purposes precludes any plate buckling. More specifically, since the movable plate 62 is placed under compression, the side or fixed plates 22, 24 resist any tendency for the central or movable plate 62 to bend. Depending upon the thickness or thinness of the plate 62, there can be some bowing but this is only to the extent permitted by the clearance between the fixed plates 22, 24. The thickness of the vertical flanges on the angle irons 14, 16, as already explained, controls the clearance at the lower edge 64 of the movable plate and the spacer block 44 the clearance at the upper edge 66 of the movable plate, these elements in turn determining the clearance throughout the length or height of the plate 62 with respect to the plates 22, 24.

Owing to the unique manner in which the actuation of the movable plate 62 is achieved, a considerable size reduction can be effected as far as the overall dimensions of the various components comprising my shear mechanism 10. Hence, my mechanism can be moved quite readily from place to place. In addition, only a few simple parts are needed in fabricating a shear mechanism of the character just described, thereby enabling it to be made and sold at a lower cost than other equipment capable of shearing the same size stock. The simplicity also virtually assures a long and trouble-free useful life.

In order to simplify the drawings, the bearings for the various pins 88, 90, 98, 100, 144 and 146 have not been shown. These bearings are preferably needle bearings, but can be sleeve bearings such as those illustrated in my hereinbefore mentioned U.S. Pat. No. 3,899,950.

I claim:

1. A shear mechanism comprising first and second relatively movable plates having corresponding first and second ends and notches extending inwardly from one of their adjacent edges toward their opposite adjacent edges, said first plate having a first circular hole nearer its said first end and its said one edge and a second circular hole nearer its second end and its said opposite edge, said second plate having a third circular hole nearer its said first end and its said opposite edge and a fourth circular hole nearer its said second end and its said one edge, a first pin received in said first hole, a second pin received in said second hole, a third pin received in said third hole, a fourth pin received in said fourth hole, first arm means connected to said first and second pins, second arm means connected to said second and fourth pins, and means for actuating said arms to produce relative movement of said plates and to cause shearing of stock placed in said notches.

2. A shear mechanism in accordance with claim 1 including a third plate having fifth and sixth circular holes, said fifth hole being in registry with said first hole and said sixth hole being in registry with said second hole, said first pin extending through said first and fifth holes and said second pin extending through said second and sixth holes.

3. A shear mechanism in accordance with claim 2 in which said first arm means includes a first arm connected to said first pin confronting the side of said first plate remote from said second plate and a second arm connected to said first pin confronting the side of said third plate remote from said second plate, and in which said second arm means includes a third arm connected to said second pin confronting the side of said first plate remote from said second plate and a fourth arm connected to said second pin confronting the side of said third plate remote from said second plate.

4. A shear mechanism in accordance with claim 3 in which said second plate has a first elongated slot through which said first pin extends and a second elongated slot through which said second pin extends, in which said first plate has a third elongated slot through which said third pin extends and a fourth elongated slot through which said fourth pin extends, and in which said third plate has a fifth elongated slot through which said third pin extends and a sixth elongated slot through which said fourth pin extends, said slots extending generally parallel to said one edge.

5. A shear mechanism in accordance with claim 4 including respective spacing means disposed between said first and third plates adjacent said first and second ends for maintaining a sufficient clearance between said second plate and said first and third plates to permit relative movement of said second plate with respect to said first and third plates.

6. A shear mechanism in accordance with claim 5 including means for fixedly mounting said first and third plates with respect to said second plate.

7. A shear mechanism in accordance with claim 1 in which said actuating means includes a cylinder containing a piston therein having a piston rod projecting from one end of said cylinder, said cylinder being connected to said first arm means and said piston rod being connected to said second arm means.

8. A shear mechanism comprising first and second relatively movable plates having opposite first and second ends and opposite first and second side edges, both of said plates having a notch extending inwardly from their said first side edges so that said notches can be moved into registry to receive stock therein and moved out of registry to shear the stock, said first plate having a pair of circular apertures, one of said apertures being nearer said first end of said first plate than the other of said apertures and also nearer said first side edge of said first plate than the other of said apertures and the other of said apertures being nearer said second end of said first plate than said one aperture and nearer said second edge of said first plate than said one aperture, said second plate having a pair of circular apertures, one of said last-mentioned apertures being nearer said first end of said second plate than the other of said last-mentioned apertures and nearer said side edge of said second plate than the other of said last-mentioned apertures and the other of said last-mentioned apertures being nearer said second end of said second plate than said one last-mentioned aperture and nearer said first side edge of said second plate than said one last-mentioned aperture, a first pin extending through said one first-mentioned aperture and said second plate having an aperture providing sufficient clearance with respect to said first pin so that said notches can be moved into and out of registry, a second pin extending through said other first-mentioned aperture and said second plate having an aperture providing sufficient clearance with respect to said second pin so that said notches can be moved into and out of registry, a third pin extending through said one last-mentioned aperture and said first plate having an aperture providing sufficient clearance with respect to said third pin so that said notches can be moved into and out of registry, a fourth pin extending through said other last-mentioned aperture and said first plate having an aperture providing sufficient clearance with respect to said fourth pin so that said notches can be moved into and out of registry, and means engaging said pins for relatively moving said first and second plates to cause said notches to move into and out of registry.

9. A shear mechanism in accordance with claim 8 in which said moving means includes a cylinder containing a piston, a piston rod projecting from one end of said cylinder and a pair of arms connected to said cylinder and said first and third pins and a pair of arms connected between said piston rod and said second and fourth pins.

10. A shear mechanism in accordance with claim 9 including a third plate corresponding to said first plate and having apertures corresponding in number and location to the apertures in said first plate, said first and third plates being fixedly disposed closely adjacent opposite sides of said second plate and said pins also extending through the apertures of said third plate.

* * * * *